(12) United States Patent
Di Giglio et al.

(10) Patent No.: US 7,987,154 B2
(45) Date of Patent: Jul. 26, 2011

(54) SYSTEM, A METHOD AND A DEVICE FOR UPDATING A DATA SET THROUGH A COMMUNICATION NETWORK

(75) Inventors: Andrea Di Giglio, Turin (IT); Raffaele Girardi, Turin (IT); Eugenlo Maria Maffione, Turin (IT)

(73) Assignee: Telecom Italia S.p.A., Milan (IT)

(*) Notice: Subject to any disclaimer, the term of this patent is extended or adjusted under 35 U.S.C. 154(b) by 594 days.

(21) Appl. No.: 11/659,824

(22) PCT Filed: Aug. 12, 2004

(86) PCT No.: PCT/EP2004/009047
§ 371 (c)(1),
(2), (4) Date: Feb. 9, 2007

(87) PCT Pub. No.: WO2006/015612
PCT Pub. Date: Feb. 16, 2006

(65) Prior Publication Data
US 2007/0255766 A1    Nov. 1, 2007

(51) Int. Cl.
G06F 7/00    (2006.01)
(52) U.S. Cl. .................. 707/620; 707/626; 707/633
(58) Field of Classification Search .......... 707/202, 707/203, 204, 620, 626, 633; 711/118
See application file for complete search history.

(56) References Cited

U.S. PATENT DOCUMENTS

| | | | |
|---|---|---|---|
| 5,574,950 A * | 11/1996 | Hathorn et al. .................. 710/8 |
| 5,933,849 A * | 8/1999 | Srbljic et al. .................. 711/118 |
| 6,023,707 A * | 2/2000 | Hamada et al. ............... 707/202 |
| 6,148,383 A | 11/2000 | Micka et al. |
| 6,304,980 B1 | 10/2001 | Beardsley et al. |
| 6,449,725 B2 * | 9/2002 | Deenadhayalan et al. .... 713/324 |
| 7,031,965 B1 * | 4/2006 | Moriya et al. .................. 707/10 |
| 7,395,265 B2 * | 7/2008 | Suzuki et al. .................... 707/10 |
| 2004/0006587 A1 * | 1/2004 | McConnell et al. .......... 709/202 |
| 2004/0034808 A1 | 2/2004 | Day, III et al. |
| 2004/0146185 A1 * | 7/2004 | Blair et al. ..................... 382/113 |
| 2005/0185862 A1 * | 8/2005 | Igarashi et al. ............... 382/305 |

FOREIGN PATENT DOCUMENTS

| | | |
|---|---|---|
| EP | 0 670 551 A1 | 9/1995 |
| WO | WO 02/069159 A1 | 9/2002 |

OTHER PUBLICATIONS

IBM PPRC White Paper "IBM and Cisco: Metro Optical Solution for Business Continuity and Storage Networking", pp. 1-4, (Aug. 2003).
EMC SRDF White Paper "EMC and Cisco Metro Optical Storage Networking Solution", pp. 1-12, (Jun. 27, 2001).
IBM Redbooks—Hints & Tips, "Asynchronous Cascading Implementations, TIPS0310", pp. 1-2, (Oct. 15, 2003).
Tom Burns; "EMC Remote Mirroring of Business Critical Information, Removing Complexity, Time and Risk", EMC Where Information Lives, pp. 1-20, (Jun. 10, 2002).
"Heterogeneous Midrange Storage with Local Mirroring and Remote IP Replication", The SNIA Supported Solutions Forum, Falconstore, pp. 1-21, (Dec. 10, 2002).

* cited by examiner

*Primary Examiner* — Tim T. Vo
*Assistant Examiner* — Gary Koo
(74) *Attorney, Agent, or Firm* — Finnegan, Henderson, Farabow, Garret & Dunner, L.L.P.

(57) ABSTRACT

A system for updating a data set through a geographical communication network. The data set is stored in a recovery storage unit located in a recovery data center and has to be updated with data blocks generated by a processing system located in a primary data center. The recovery data center is associated through the geographical communication network to a device provided with a temporary storage area for temporarily storing in corresponding storage locations the incoming data blocks generated by the processing system and directed to update the data set, wherein a first synchronous acknowledgement signal is provided to the primary data center acknowledging the successful writing in the temporary storage area of the data blocks as soon as the data blocks are written in the temporary storage area so as not to block or slow down the normal way of operating of the processing system, and wherein the locations of the temporary storage area occupied by the data blocks are made available for new incoming data blocks when a second acknowledgement signal is received acknowledging the successful updating of the data set.

33 Claims, 13 Drawing Sheets

SYSTEM, A METHOD AND A DEVICE FOR UPDATING A DATA SET THROUGH A COMMUNICATION NETWORK

CROSS REFERENCE TO RELATED APPLICATION

This application is a national phase application based on PCT/EP2004/009047, filed Aug. 12, 2004, the content of which is incorporated herein by reference.

FIELD OF INVENTION

The present invention relates to a system, a method and a device for updating a data set through a communication network.

In particular, the invention relates to a system, a method and a device for updating through a geographical communication network and in synchronous mode, data sets from a first storage unit, located in a Primary Data Centre, to a second storage unit, located in a Recovery Data Centre which is geographically far away from the Primary Data Centre, wherein the data stored in the Recovery Data Centre can be used in case of a disaster scenario involving the Primary Data Centre.

More particularly, the invention relates to synchronous mirroring techniques for protecting data sets.

BACKGROUND OF INVENTION

In high availability computing architectures, a widespread way of protecting important data from damage or loss, in case of a disaster, is represented by the mirroring technique. Said technique provides for maintaining at least two copies of important information stored in at least two different storage units arranged in two different sites: a first local copy, which generally represents the "work copy", is directly used by a software application running in a main computing system (computer) located in the Primary Data Centre (PDC), while a second copy is located in the remote Recovery Data Centre (RDC) and is used within the ambit of a disaster recovery process in case of failure of the main computing system.

There are known in the art at least two methods for carrying out data set replication: a first technique or method, known as synchronous mirroring, wherein the updating of a remote copy at the RDC is concurrent with the modification of a data item in a local copy at the PDC;

a second technique, known as asynchronous mirroring, the updating of the remote copy occurs in accordance with a batch policy.

The synchronous mirroring technique, which is the relevant art for present invention, provides, in general, for the following steps:

a—writing a data item on a local storage unit;
b—writing the data item on a remote storage unit;
c—waiting for an acknowledgement signal ACK from the remote disk before repeating steps a) and b) by writing again a new data item.

The synchronous mirroring gives more guarantee of recovering the status of the main computing system in case of failure, data loss or disaster, because it allows to have at least two storage units perfectly aligned in every moment.

In case of a disaster, by using synchronous mirroring it is possible to keep low the so called Recovery Time Objective or RTO, that is the time interval necessary for restoring the normal working of a software application identical to the applications running at the PDC before the disaster.

In fact, by adopting a synchronous mirroring technique, it is granted to reduce the deviation, between a main data set and its copy useful for restarting the software application, ideally at one transaction.

In the art, the deviation, measured in time, between the main data set and its copy, is usually named Recovery Point Objective or RPO.

It is to point out that the sequence of steps relative to the synchronous mirroring requires that the software application at PDC is locked for a time interval elapsing from the production of a data item by the software application itself to the receipt at PDC of an acknowledgement of the writing of the data item (writing operation) by the remote storage unit at the RDC. This time interval can be estimated as the sum of:

the serialisation time of the data item;
the round trip time, that is the sum of the propagation delay and of the processing and queuing time in the apparatuses existing along the connection between the main computing system and the remote copy;
the writing time of the data item on the disk into the RDC;
the production and serialisation time of the acknowledgement signal, said time being negligible with respect to the serialisation time of the data item and the round trip time.

In general, the minimum round trip time can not be lower than the time interval relative to the physical propagation (propagation delay) in the used medium, said time interval being directly proportional to the distance on the physical connection between the computer in the Primary Data Centre (PDC) and the remote storage unit in the Recovery Data Centre (RDC).

It is well known within the storage industry and thoroughly documented in publications by storage software and hardware vendors that synchronous mirroring slows down the performance of the software applications producing the data involved in synchronous replica (mirroring). As the distance between PDC and RDC grows, applications performances decrease in a proportional way. As an example, assuming that the only limiting effect is the propagation delay, an increase of the distance between PDC and RDC from 10 km to 100 km provides an increase of the write response time (round trip time) by a factor of 10; as a consequence the application throughput can be reduced, depending on the amount of the rate of the write operations, up to 90%.

Anyway, Applicant believes that the distance limit beyond which those performances become unacceptable to sustain the normal functionality of the computing system at PDC cannot be defined in a simple and unique way, because it strictly depends on the kind of business and related software applications (size and frequency of the write operations) and on physical characteristics of the communication network between PDC and RDC (bandwidth, technology and topology).

Some literature sources indicate some distance limits about synchronous mirroring:

Nortel Networks white paper "Storage Distance extension: increasing the reach and utility of networked storage applications", indicates 400 km as the distance limit even when using high-bandwidth links;
Hitachi white paper "Business Continuity Solution Blueprint—Synchronous data replication" indicates 50 km, states that the distance limit depends in particular on the application response time;
Proprietary solutions for synchronous mirroring indicate different distance limits due to the particular software managing the data replication; more in particular IBM PPRC (White Paper "IBM and Cisco: Metro Optical Solution for Business Continuity and Storage Networking", August 2003) indicates 40-100 km as distance limit. EMC SRDF (White Paper "EMC and Cisco Metro Optical Storage Networking Solution", 27 Jun., 2001) indicates 80 km as the maximum distance limit.

Applicant notes that, even in presence of high bandwidths, whereby the serialisation time is negligible, and in presence of dedicated circuit connections, whereby the round trip time is reduced at a minimum, the synchronous mirroring technique can not in general be applied to connections having any distance between PDC and RDC.

Such a limit contrasts with the typical requirement of high availability computing architectures according to which it is necessary to store the replication of the data in a site located at large distance, e.g. some hundreds of kilometres from the work copy, so as to allow an higher level of protection in case of huge disaster.

In order to getting round the above problem intrinsic to the synchronous mirroring technique, a technique known as multi-hop disk mirroring has been proposed. Such technique has been described for instance in "Asynchronous Cascading Implementations, TIPS0310", IBM Redbook—Hints & Tips, Oct. 15, 2003, available in Internet on Jun. 14, 2004 at the Web site http://publib-b.boulder.ibm.com/Redbooks.nsf and in "Remote Mirroring of Business Critical Information", EMC, Jun. 10, 2002, available in Internet on Jun. 14, 2004 at the Web site http://italy.emc.com/local/it/IT/download/pdf/giugno2002/Burns.pdf.

The multi-hop mirroring technique provides for carrying out a synchronous mirroring at an intermediate site located at a distance compatible with the limits imposed by the software application at the PDC and for replicating the data asynchronously towards the RDC site.

Applicant notes that the multi-hop mirroring has the drawback of introducing complex elements in the end-to-end chain.

According to the known art, multi-hop mirroring requires to introduce storage units in the intermediate site, which must have at least the same storage capability of the storage unit in the PDC.

Such a solution reduces the overall reliability of the architecture.

Moreover, since the updating from the intermediate site to the recovery site (RDC) typically occurs in batch mode at a relatively low frequency, relevant differences can arise between the main data sets and the recovered data sets.

In case of disasters having a range of action including both the primary site (PDC) and the intermediate site, it could be, therefore, impossible of obtaining a very low Recovery Point Objective or RPO.

The paper "Heterogeneous Midrange Storage with Local Mirroring and Remote IP Replication", Falconstore, Dec. 10, 2002, available in Internet on Jun. 14, 2004 at the Web site http://www.falconstor.co/Whitepapers/ MidrangeSSFSolutionWhitePaper.pdf and the PCT patent application no. WO 02/069159 discloses a mirroring technique wherein it is provided a device located at PDC and inserted between the main computing system, running the software application, and the local storage unit. The copy on the remote storage unit always occurs asynchronously through the device located at PDC.

In summary, Applicant believes that no solution is known in prior art for carrying out a synchronous mirroring independent from the distance between PDC and RDC and having a very low RPO.

SUMMARY OF INVENTION

It is therefore an object of the present invention to provide for a system, a method and a device for updating a data set through a communication network thus allowing the implementation of a distance independent synchronous mirroring technique.

It is a further object of the present invention to allow a Service Provider, having, for example, a centralized Recovery Data Centre, to offer to an high number of customers or clients, having each a respective Primary Data Centre, a disaster recovery service, even if said customers are not located in the same metropolitan area of the centralized Recovery Data Centre, while guaranteeing, in any case, to said customers an RPO and an RTO comparable with the synchronous mirroring technique.

It is a further object of the present invention to provide for a computer program product or a set of computer program products able to manage the operations to be performed for implementing the method according to the invention.

The above objects of the present invention are achieved through a system, a method, a device, a computer program product and a network as claimed in the hereby attached claims.

According to the invention, it is provided a system and a method to carry out a synchronous updating of a data set from a Primary Data Centre PDC to a remote disk or memory support, associated to a Recovery Data Centre RDC, geographically located, for instance, at a large distance from the PDC, wherein said distance, for instance, is greater than the distance able to grant an RPO under a reasonable limit.

According to the invention, a temporary storage device is provided, having a temporary storage area for storing data blocks generated by the PDC and located, for instance, at an intermediate site between the PDC and the RDC.

The temporary storage device is configured with predetermined storage capabilities and comprises an intelligent cache software program able to provide synchronously to the client processing system or PDC an acknowledgement signal of successful writing, i.e. an acknowledgement signal within a very short time interval and comparable with the time interval of the synchronous mirroring technique, e.g. indicatively within 1 ms.

According to the invention, a plurality of client processing systems (clients) and/or Primary data Centres may share the storage area of the temporary storage device.

According to a further feature of present invention, the cache size allocated to the client in the storage area of the temporary storage device is determined independently of the size of the data volumes to be updated.

In particular, according to a preferred embodiment of present invention, the cache size is determined as dependent:
- on the bandwidth used between the client processing system and the temporary storage device;
- on the bandwidth used between the temporary storage device and the recovery site RDC; and
- on the rate of data produced by the client software application at PDC, where, for instance, the data rate is quantifiable as the number of data produced or modified in a unit time.

In summary, the present invention provides the following advantages with respect to known prior art:
- optimisation of the RPO which is rendered equal to that of a single-hop synchronous mirroring technique (no misalignment between the local and the remote disk) for a failure or damage in a range of interest lower than the distance between the Primary Data Center PDC and the temporary storage device, that is to say when the storage device is not damaged;
- RPO very close to zero (misalignment limited to a few transactions of the application) for events which impact also on the intermediate site; in this case, the data existing in the intermediate site and not yet copied to the remote disk are lost, but according to the way of transferring data disclosed in the present invention the lost data are intrinsically a very limited amount;

RTO very low and comparable with the RTO obtainable by means of a synchronous disk mirroring technique applied between the Primary Data Centre and the Recovery Data Centre;

independency from the distance or no limitation concerning the distance between the local disk and the remote disk, as it occurs on the contrary in the single-hop synchronous mirroring technique, while offering equivalent reliability in terms of RPO and RTO;

a limited amount of data stored in the intermediate site, since the method proposed by the present invention does not require that the intermediate site contains the whole data set of the local disk of the Primary Data Centre.

BRIEF DESCRIPTION OF THE DRAWINGS

The invention will be now disclosed here in below with reference to the attached drawings of preferred but non limiting embodiments thereof, in which.

Throughout all the Figures the same references have been used to indicate components that are equal or implement substantially equivalent functions.

DETAILED DESCRIPTION OF THE INVENTION

Although the invention will now be described with reference to a disk mirroring technique, it is however to be noted that the same inventive principle can be successfully implemented in different environments where no mirroring application is carried out, e.g. in case of failure of the local disk or in those applications where a local copy of the data set in not provided.

Figure 1:
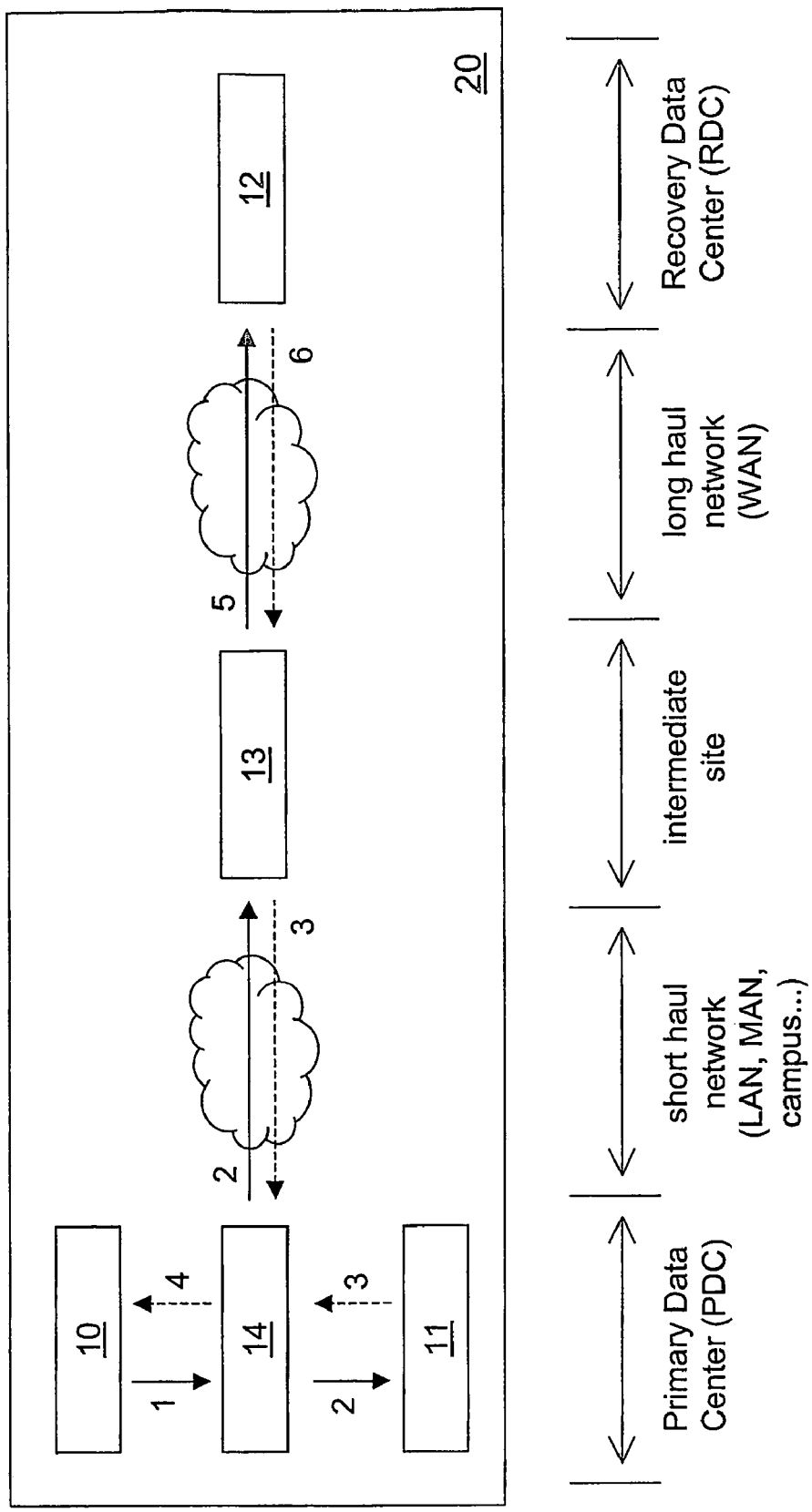
FIG. 1 illustrates a block diagram of a disk mirroring system according to the present invention.

FIG. 1 shows a disk mirroring system wherein, according to the invention, it is provided to interpose a temporary data repository device 13 between a processing system or client system 10, wherein a software application is running, and its relative local disk unit 11 of a Primary Data Centre PDC on the one side and a remote disk unit 12 of a Recovery Data Centre RDC on the other side. The device 13 is placed, for example, in a site geographically intermediate between the local disk 11 and the remote disk 12 wherein, for example, the distance between the intermediate site and the RDC is preferably greater than the distance between the PDC and the intermediate site.

The term distance, according to present invention, is representative, for example, of the length of the optical fibre or communication cables used for connecting the PDC to the intermediate site and for connecting the intermediate site to the RDC.

Figure 2:
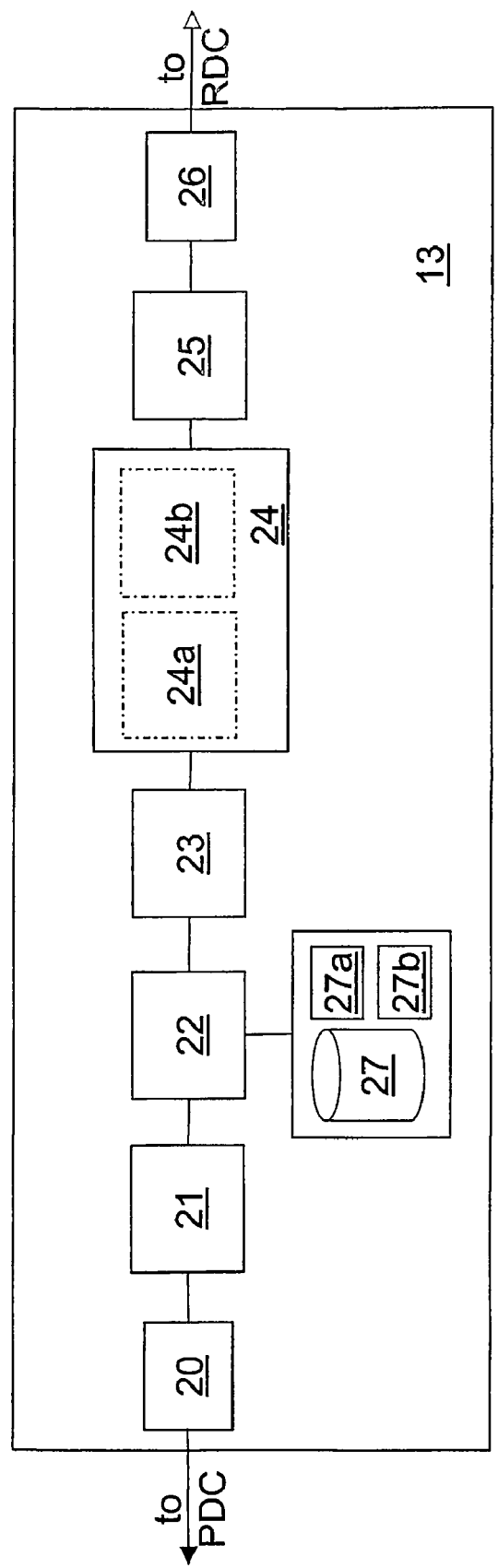
FIG. 2 is a block diagram of a device according to the present invention.

With reference to FIG. 2, it is explained in detail the architecture of the temporary repository device with its modules 20-27.

According to a preferred embodiment of present invention modules 20-27 are implemented in software, but, as can be apparent to a skilled person, such modules may be implemented by means of hardware modules comprised of integrated circuits or programmable logic.

Modules 20 and 26 constitute the front-ends respectively towards the Primary Data Centre PDC and towards the Recovery Data Centre RDC. Modules 20 and 26 can be two identical objects, like for instance Network Interface Cards or NICs, the same object, like for instance a single NIC, or different objects, where for instance module 20 can be a NIC and module 26 can be a Host Bus Adapter HBA or vice versa. Modules 20 and 26 are in substance terminator devices of a transport protocol, that is devices managing the exchange of information across the network.

Module 21, arranged downstream of module 20, constitutes a target device of a protocol used for remotely mirroring data. The target device 21 receives I/O commands from the Primary Data Centre PDC and co-operates with module 22. A target device performs operations requested by an initiator device, that is to say a device requesting an I/O process.

Module 22, arranged downstream of module 21, realises a software filter intercepting the I/O commands and deciding whether to forward them to a cache system module 27 or to the RDC through the remaining modules 23-26.

Module 23, arranged downstream of module 22, is a virtualisation module which has the task of presenting to the PDC logical storage areas, which are different from the physical storage areas reserved for the disk volumes existing in the RDC.

Module 24, arranged downstream of module 23, has the task of receiving a data block with its relative address parameters and of encapsulating it inside commands reserved for the management of the storage disk in the RDC.

Module 25, arranged downstream of module 24, is an initiator device which co-operates with module 26.

Figure 3:
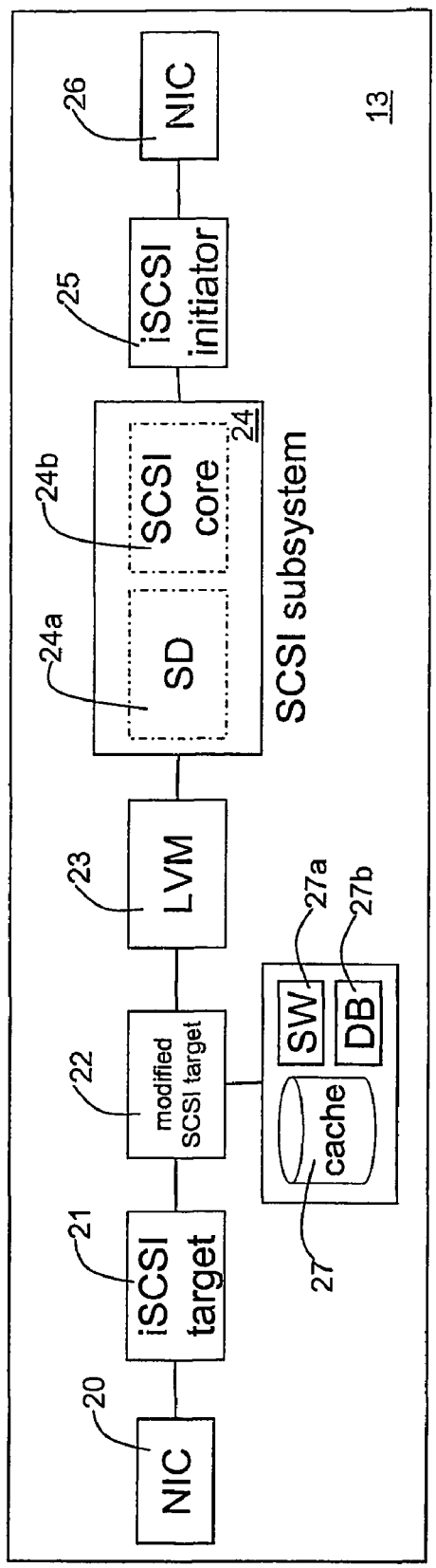
FIG. 3 is a block diagram of a first embodiment of the device of FIG. 2.

With reference to FIG. 3, it will be now described a first embodiment of a temporary data repository device 13 according to the invention, when using the iSCSI/SCSI protocol (Internet Small Computer System Interface/Small Computer System Interface) for remotely transferring the datablocks.

Modules 20 and 21 can be respectively represented by a transport protocol terminator, e.g. a NIC, and by a target device of a protocol for remotely storing data, e.g. a modified version of an iSCSI target device. In this case the module 22 is a modified commercial or free version of a SCSI target device. Said modification substantially consists in building a software filter intercepting the SCSI commands for a determined Logical Unit Number LUN and addressing said commands either to the cache system 27 or to the remaining modules 23-26 of the device 13 for forwarding the commands to the RDC.

This chain of interworking modules 23-26 is comprised of a Logical Volume Manager LVM 23 in case of an implementation based on the Linux operative system. The further modules 24-26 are normally available standard modules as well, and in Linux they can be comprised of a native SCSI subsystem or control unit 24 co-operating with an iSCSI standard initiator 25 and a NIC 26.

When using the Logical Volume Manager 23 in Linux environment, it is necessary that the modified SCSI target device 22 provides for an I/O block interface compatible with the LVM 23.

According to a further embodiment of present invention, the Logical Volume Manager 23 23, can be avoided.

However, according to a preferred embodiment, it is useful to provide for the presence of the Logical Volume Manager 23, as it allows to create logical partitions addressing storage areas pertaining, for example, to a plurality of Recovery Data Centres that may be geographically separated.

As a skilled person may understand, LVM 23 may be replaced by a software virtualisation device.

The device 13 proposed in FIG. 3, wherein SCSI is the storage management protocol and iSCSI is the protocol for remotely storing data both in the section PDC-device 13 and in the section device 13-RDC is only one example of the possible protocols that may employed for the device 13.

Figure 4:
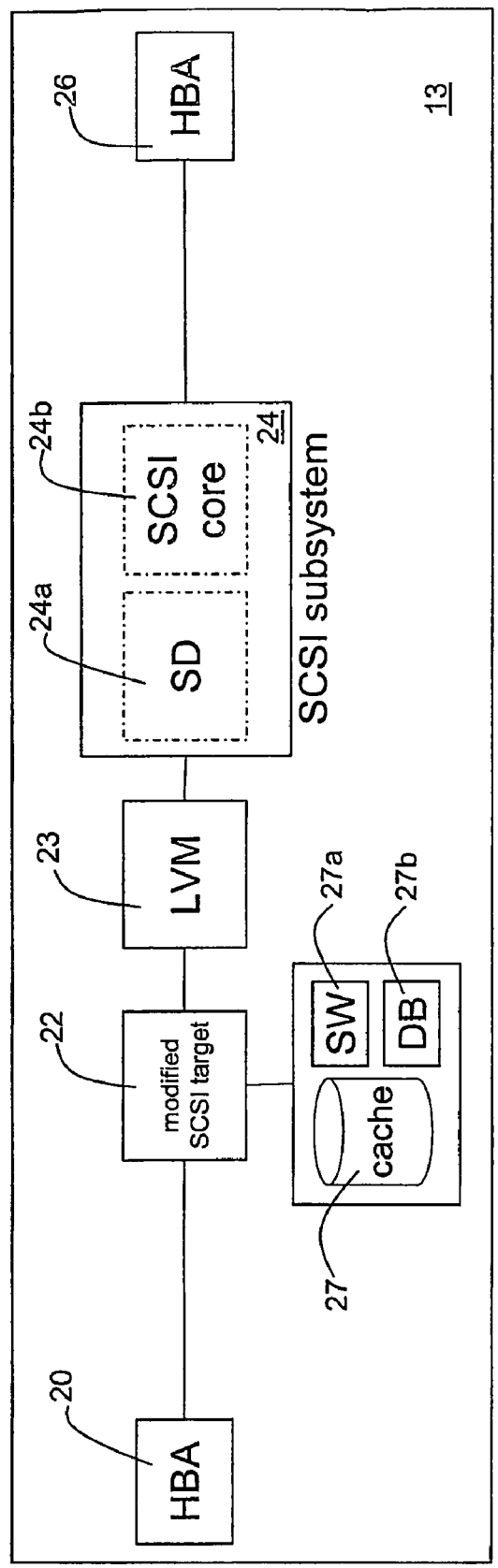
FIG. 4 is a block diagram of a second embodiment of the device of FIG. 2.

FIG. 4 illustrates a second possible architecture of the device 13. In this version SCSI is still the storage management protocol but the Fibre Channel protocol is used for remotely transferring the data.

In this embodiment the network interfaces are represented by Fibre Channel Host Bus Adapter (HBA) that substitutes from a functional point of view the set of NIC and iSCSI target/initiator related to the embodiment depicted in FIG. 3.

However, also hybrid solutions are possible, said solutions providing for different protocols for remotely storing the data in the two network sections separated by the device 13 either not making use of SCSI as management protocol of the storage devices, or still providing for more communication technologies like in case the RDCs are more than one and are managed with different technologies. Hybrid solutions impact also on the protocol typology managed by the module 24 of FIG. 2.

The device 13 can be implemented as a set of functions or modules into dedicated appliances or into network devices, e.g. router, Optical/Digital Cross Connext (ODXC), FC switch, and so on.

With reference again to FIG. 1 wherein the arrows indicate the operations carried out, it will be now described how the disk mirroring system 20 works.

In the following the term "data block" indicates the logical association of:
the information to be stored (data) in the RDC;
the I/O operation attributes like the address or the set of addresses of the memory location on the destination storage system;
additional data attributes to be stored together with the information.

Following an I/O request 1 issued by the software application running on the processing system 10, a mirroring software 14 installed in the Primary Data Center PDC sends a replication 2 of the I/O request 1 both to the local disk 11 and to the device 13.

The local disk 11 and the temporary repository device 13 reply to the I/O request 2 by sending a suitable acknowledgement signal 3 to the mirroring software 14 which in turns send a corresponding acknowledgement signal 4 to said processing system 10. Thereafter the temporary data repository device 13 takes charge of transferring a data block 5 to the remote disk 12 of the Recovery Data Centre and to manage a relative acknowledgement signal 6.

Therefore the temporary data repository device 13 has the task of:
returning to the software application through the disk mirroring software 14 a signal 3 acknowledging the reception and the writing of the data item in the device 13 so as not to block or slow down the normal way of operating of said software application;
temporarily storing the data block to be transferred to the remote disk 12;
asynchronously transferring the data block 5 to the remote disk 12 where the whole data set of the local disk 11 is reconstructed.

The Primary Data Centre PDC and the Recovery Data Centre RDC have respectively the same functionality that both would have when using a traditional single hop disk mirroring technique and the introduction of the temporary data repository device 13 does not alter their normal way of operating so that the device 13 is actually transparent to the software application.

The device 13 can be applied either in a network wherein both the Primary Data Centre PDC and the Recovery Data Centre RDC are administered by the same administrator, for instance a company, or in a service scenario wherein the RDC is managed by a Storage Service Provider SSP and the Primary Data Centre PDC is owned by a customer company which buys the data replication services by the Service Provider.

Moreover, a plurality of clients connected to the same Primary Data Centre PDC may share the same temporary repository device 13.

As far as the operations of the temporary data repository device 13 (FIG. 2) and of the relative architecture (FIG. 1) are concerned, three main modes (or phases) can be identified:
1. set-up phase: that is the configuration of the general architecture of the device 13 to serve a new client/application;
2. normal operation phase: comprising the destaging process and filtering I/O commands;
3. recovery from failure events phase.

The set-up phase, that includes all the operations necessary to enable a new client/application to make use of the device according to the invention, will be now described. At least two different steps are provided:
a) enabling the use of a physical volume disk existing in the RDC in a transparent way for the PDC and the RDC through the temporary data repository device 13;
b) enabling the use of the functionality of the invention as if a synchronous mirroring technique was implemented between PDC and RDC.

As far as the set-up phase step a) is concerned, a new client knows the image of a logical volume to which it has access by suitably configuring module 23, as can be apparent to a skilled person, of the temporary data repository device 13.

To said logical volume, which is the logical image of physical partitions existing in the RDC, it will be associated an identifier used by the client application for accessing said logical volume. In particular a logical image of the volume inside the device 13 may be useful to send an error message for a wrong addressee without waiting for a negative response from the final destination.

As far as the step b) is concerned, said step b) being realised so that the client application can use the remote physical disk volume through the device 13 as a synchronous image of a disk volume (local copy) existing in its premises, in the preferred embodiment it is provided that:

a consistent copy of the volume is transferred to the remote site (first synchronisation);

a storage area is reserved for that client in the cache system module 27 of the device 13;

said storage area makes reference to the configuration data (set of addresses, volume size, block size and so on) describing the characteristics of the volume addressed by the client, said configuration data being stored in an internal database 27b of the cache system module 27;

it is enabled inside the module 22 a filtering process of the commands issued by the client mirroring software so that some of these commands, e.g. cleaning the heads of the remote disk units, formatting the disk, and so on, are forwarded through the module chain 23-26 towards the RDC, while some other commands, e.g. writing data or reading data, are intercepted and forwarded to the cache system module 27.

a cache control software 27a is informed that a new client has been enabled and that a particular storage area inside the cache system module 27 has been assigned to said client.

The normal operation phase is entered after the set-up phase. This phase includes at least two main processes:

1. the destaging process for moving the data stored in the cache of the device 13 to the RDC,
2. the I/O command filtering process that intercepts write and read operations and coherently manages the cache of the device 13.

Figure 5A:
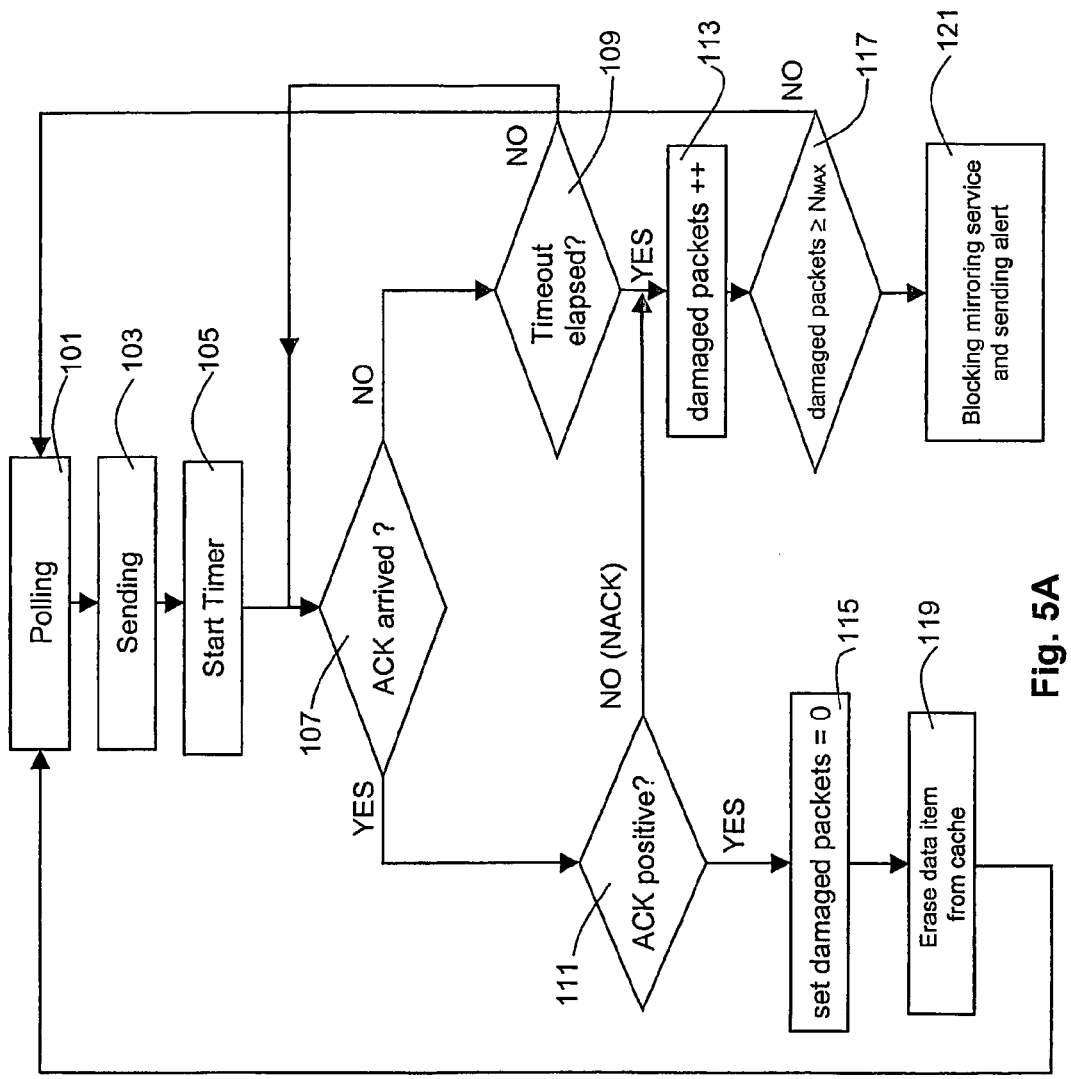
FIG. 5A, 5B and 5C are respectively flow charts of a destaging, a writing and a reading procedure carried out by the device of FIG. 2.
Figure 5B:
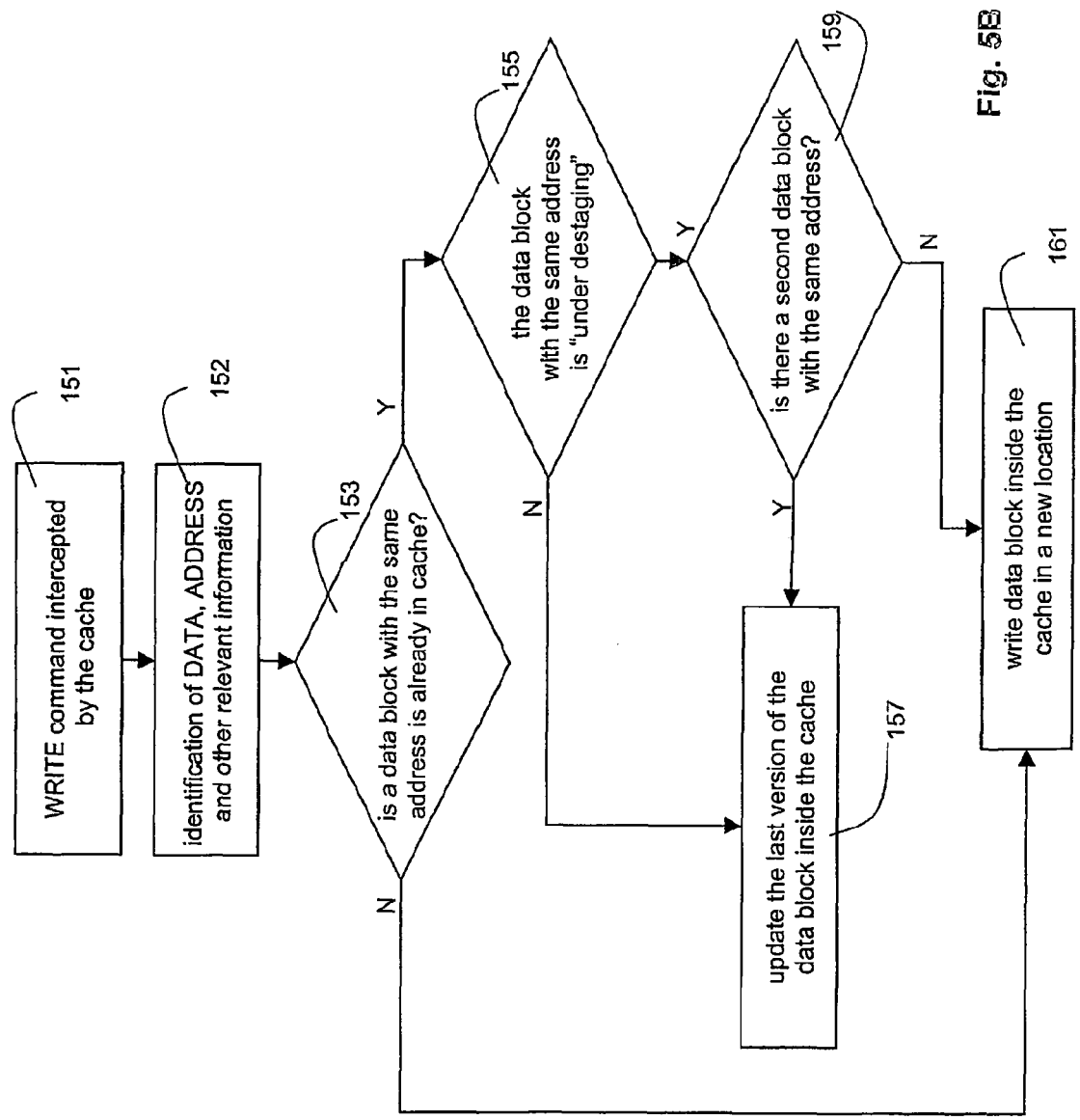
Figure 5C:
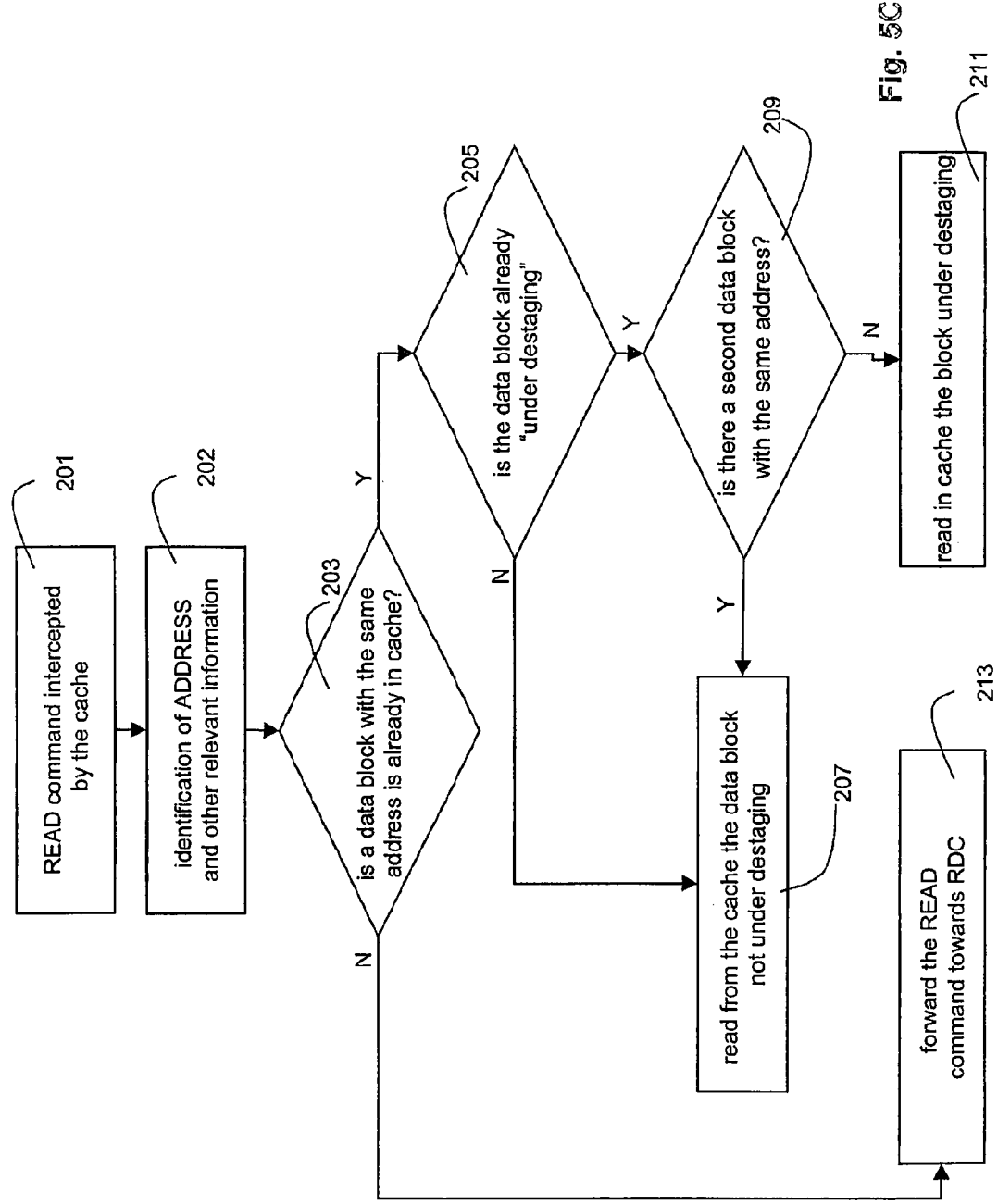

With reference to the FIGS. 5A, 5B and 5C, it will be now described in detail the process controlling the destaging/writing/reading operations concerning the cache system module 27.

FIG. 5A represents a flow chart showing how the destaging process implemented inside the cache control software 27a of FIG. 2 operates.

The cache software 27a first executes a continuous polling (step 101) of all the cache storage areas corresponding to the different clients and checks whether there are some data blocks in the cache 27 which have not been forwarded to the RDC yet.

After a data block is identified in the cache by the poller, the process can wait a maximum configurable time (waiting time) before sending it to the RDC. The polling period, the waiting time and the time needed for transmitting the data block on the network connection between the device 13 and the RDC (serialization time) are configurable parameters by the administrator with the constraint that their sum preferably must be lower than the average inter-arrival time between two data blocks for the cache to be in a stable stay.

Moreover the forwarding of a data block to RDC can follow user defined policies in order to modify the priority of data block destaging, for example to advantage specific clients or applications over others (prioritization). Anyway the prioritization policy must not conflict with the above mentioned consideration on destaging delay.

All the blocks that have to be forwarded to the RDC are sent to the RDC (step 103).

Once a data block has been sent, it is not contextually erased from the cache 27 but it is erased only when a acknowledgement signal issued by the RDC confirms that the data block has actually arrived not corrupted there (step 107).

In this state a data block is marked as "under destaging" and the process for selecting the data block to be forwarded to the RDC takes care of avoiding to put "under destaging" a data block having the same address of another data block already "under destaging". This is done in order to avoid interference with the writing process described below.

In fact, for preventing loss of data, the data block remains stored in the cache 27 until the RDC has actually stored the data block sent from the cache. In other words, there is a sort of delivery control preventing the loss of data while transferring a data block from the device 13 to the RDC. This control is represented in FIG. 5A by the blocks arranged below the sending block 103.

In any case, if the devices 23 and/or 24 adopt some mechanisms of delivery control of known type, these will be harmonised with the ones adopted by the cache to avoid interference.

When analysing the possible states, a data block may:
a) arrive to the RDC without errors;
b) arrive to the RDC but corrupted;
c) never arrive to the RDC.

For recognising the above mentioned states a), b) and c), the process implemented in the cache control software 27a provides:

in case a) a positive acknowledgement signal ACK (step 111, arrow downwards);

in case b) a negative acknowledgement signal NACK (step 111, arrow rightwards), if a NACK signal can be correctly interpreted by the protocol used for remotely transferring the data;

in order to recognise the state c), it is set a timeout delay which is greater than an estimation of the round trip time between the device 13 and the RDC; once the timeout delay has elapsed (step 109) and a positive ACK or negative NACK acknowledgement signal has not arrived (step 107, arrow leftwards), the data block sent by the cache 27 is considered to be lost. The timeout delay starts upon sending of the data block (step 105). The control blocks 111, 115 and 119 following a positive acknowledgement signal (step 111, arrow downwards) manage the above mentioned case a), and the control blocks 111, 113 and 117 manage case b) while the control of the timeout delay is performed by the control block 109 which, once the predetermined timeout delay has elapsed, assumes that the data block has not been received by the RDC.

In a preferred embodiment it is provided to set a maximum number $N_{MAX}$ of corrupted/lost consecutive blocks in the connection with the remote site; if this maximum number $N_{MAX}$ is reached (step 117), the cache 27 informs the client that the mirroring service is discontinued (step 121) thereby hindering the sending from the PDC to the cache of further data to be transferred.

In fact, if the RDC is unreachable, the cache 27 would continue to receive data by the client without having the possibility of forwarding them to the RDC and therefore the cache 27 would be quickly overloaded.

In a further embodiment, in case the protocol used for remotely transferring data does not provide for a negative acknowledgement signal NACK, it is applied the same process of the timeout delay also for the corrupted data blocks, that is to say after having reached a predetermined number of consecutive corrupted blocks the mirroring service is discontinued.

The I/O command filtering process, implemented in module 22 of FIG. 2:
intercepts the commands from PDC to RDC;
identifies the type of operation (WRITE, READ, other operations) considering one or more PDUs (Protocol Data Units) according to the particular used protocol.

In case of I/O commands differing from WRITE and READ, the device 13 forwards them to RDC. In case of WRITE or READ commands the first step consists in extracting the parameters of the I/O operation:
- in case of WRITE commands, the parameters are, for example, the whole data block, that is: the data to be stored, the operation attributes (e.g. the address of the memory location) and the additional data attributes;
- in case of READ commands, since the data are to be acquired, the parameters are, for example, only the operation attributes.

The operations are processed as described below.

With reference to FIG. 5B, it will be now described how the writing commands issued by the mirroring software 14 of FIG. 1 and forwarded to the device 13 of FIG. 1 are managed by the cache software 27*a*.

Inside the device 13, the writing commands issued by the mirroring software 14 are intercepted by the block 22 of FIG. 2 and analysed according to the process described in FIG. 5B.

After a WRITE command has been intercepted by the cache (step 151), the relevant parameters (data block) of I/O operation are identified (step 152).

According to the preferred embodiment, four possible states are provided for a concerned data block to be written in the cache 27 and its status inside the cache. As a skilled person could understand, the number of states may be lower or higher.

In particular the states according to the preferred embodiment are:
- case 1): if a data block with the requested address is not present in cache 27 (step 153), then a new cache location available to that client is used and the data block is written in said new location (step 161);
- case 2): if a data block with the requested address is already present in cache 27 (step 153) and it is not "under destaging", then the new data block replaces the existing old one (step 157);
- case 3): if a data block with the requested address is already present in cache 27 (step 153) but is "under destaging" (step 155), that is to say the system is still waiting for the acknowledgement signal by the Repository Data Centre RDC, and a second data block with the same address is not present in cache 27 (step 159), then the data block is written in a new cache location (step 161);
- case 4): if two data blocks with the requested address are present in cache (one of them "under destaging" and the other one not) then the new block replaces the existing one (step 157) not "under destaging".

In any case, after the recording of the data block has been completed, the writing process signals the successful operation to the I/O commands filter (module 22 in FIG. 2) that in turn returns to the mirroring software in the PDC the ACK signal required by the I/O protocol currently used.

If the data block cannot be recorded in the cache for any reason (e.g. the cache has not free capacity), the ACK is not returned, blocking the sending of further write commands by the PDC, thereby avoiding that the cache is filled over its maximum capacity and that data blocks are lost.

FIG. 5C shows how the process implemented in the cache control software 27*a* of FIG. 2 manages the reading commands issued by the mirroring software to the remote disk in RDC and therefore arriving to the device 13 of FIG. 1.

Although it is possible to read data from the cache 27, it should be pointed out that the cache preferably does not have the task to replace the RDC.

Inside the device 13, the reading commands issued by the mirroring software 14 are intercepted by the block 22 of FIG. 2 and analysed by the process described in FIG. 5C.

The management of the reading process is focussed on guaranteeing that in every moment the software application, running in the processing system 10 of FIG. 1, receives the updated data either in case the updated data are in cache 27 (under destaging phase or not) or in case the data are only in the RDC.

After a READ command has been intercepted by the cache (step 201), the relevant parameters of I/O operation (e.g. the address of the memory location) are identified (step 202).

According to the preferred embodiment, four possible states are provided for a concerned data block to be read. As a skilled person could understand, the number of states may be lower or higher.

In particular:
- case 1): if a data block with the requested address is not present in cache 27 (step 203), then the read operation is forwarded to the RDC through the modules 23-26 of FIG. 2;
- case 2): if a data block with the requested address is present in cache (step 203) and it is not "under destaging" (step 205), then the data block is read from the cache and the data are returned to PDC (step 207);
- case 3): if a data block with the requested address is present in cache (step 203) but it is "under destaging" (step 205), that is to say the system is still waiting for an acknowledgement signal by the RDC, and a second data block with the same address is not present in cache 27 (step 209), then the reading operation returns the data content of the data block "under destaging" (step 211);
- case 4): if two data blocks with the requested address are present in cache (one of them "under destaging" and the other one not) then the data content of the data block not "under destaging" (step 207) is returned.

The recovery from failure event phase is now described with reference to FIG. 6.

Figure 6:
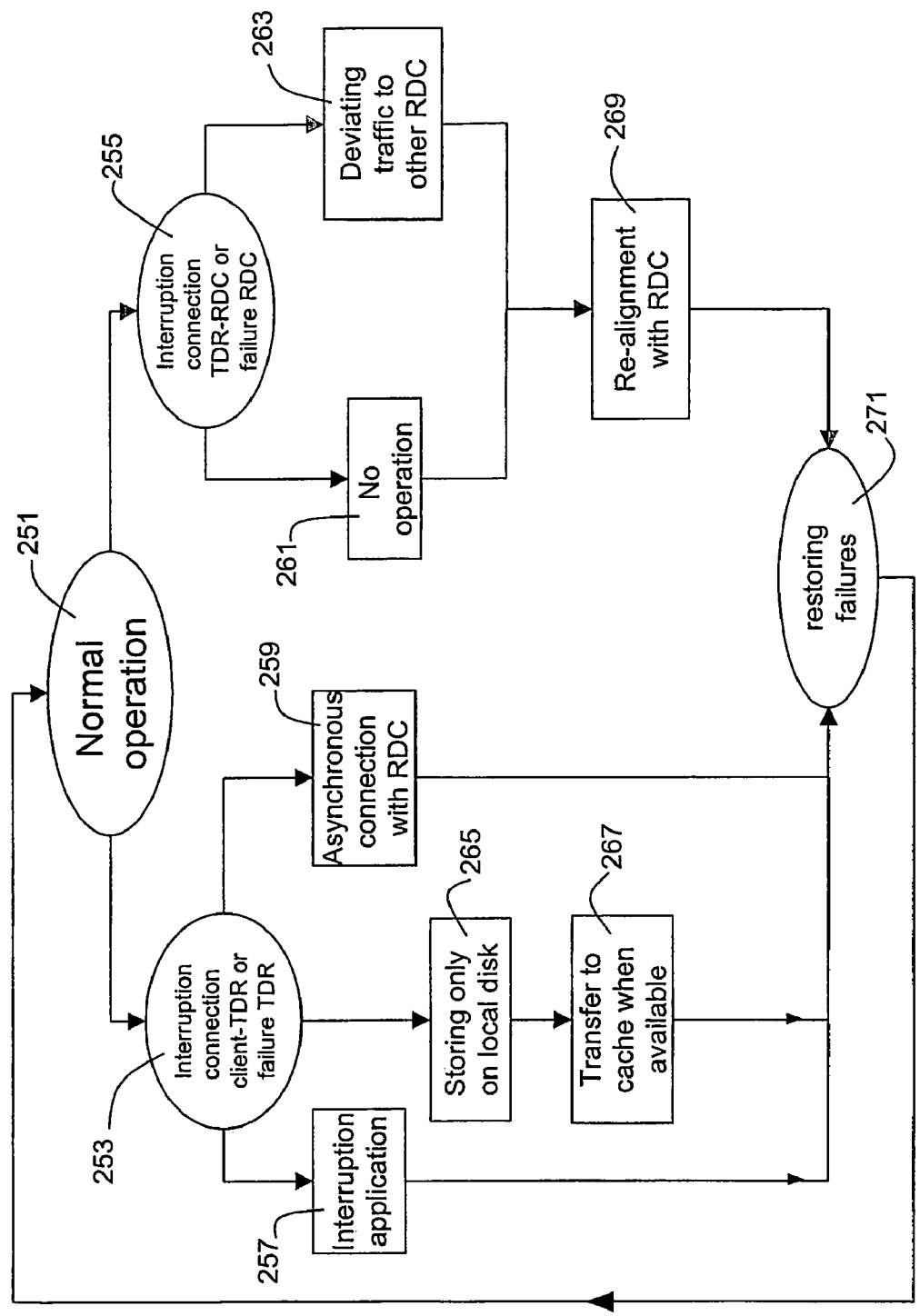
FIG. 6 is a flow chart showing possible failure states of the disk mirroring system of FIG. 1.

FIG. 6 illustrates possible failure states and some behaviours that can be adopted accordingly. In particular, from the initial state of normal operation (block 251) at least two categories of anomalies can be envisaged:
a) a connection failure between the client and the temporary data repository device 13 or a failure of the device 13 itself (block 253), whereby it is impossible to write in the cache 27 of FIG. 2 of the intermediate site;
b) a connection failure between the device 13 and the Recovery Data Centre RDC or failure of the RDC itself, whereby it is impossible to access the RDC. Case a) is explained in detail in the left branch of the flow chart of FIG. 6. It is possible alternatively:
- to interrupt the disk mirroring, in case it is absolutely required a synchronous transfer according to the invention (step 257);
- to temporarily store data in the local disk of the primary data centre (step 265) and to complete the data block transfer to the cache 27, and consequently to the RDC, once the connection has been restored (step 267);
- to by-pass the unavailable cache and to perform an asynchronous mirroring directly with the RDC.

Case b) is explained in detail in the right branch of the flow chart of FIG. 6. It is possible:
- if the cache has a sufficient storage capability and it is estimated that the unavailability is rather short in time, to make no operation (step 261) and to continue storing the transactions in the cache while waiting for the connection to be restored so as to align the disk in the RDC by using the destaging process of FIG. 5A (step 269);

as an alternative, to copy the data present in the cache to an alternative site (step 263) so as not to saturate the cache if the unavailability is rather long in time.

Referring again to FIG. 3, wherein SCSI is the storage management protocol and iSCSI is the protocol for remotely storing data both in the section PDC-device 13 and in the section device 13-RDC when a client wishes to make use of the device 13, it receives during the start-up phase the image of a logical volume in the LVM to which it can access through the iSCSI protocol.

To this volume, which is the logical image based on physical partitions existing in the RDC, it will be associated a specific LUN (Logical Unit Number) according to the SCSI technology that will be used by the client application for accessing it.

At this point the client application, that as it is shown in FIG. 1 interacts with the device 13 through the mirroring software 14, can access via the iSCSI/SCSI protocol a remote volume in the RDC.

By this time, in order that the application can use the remote volume through the device 13 as a synchronous image of a local volume disk in the PDC, it is preferable that:

a consistent copy of the local volume disk is transferred to the remote site (first-time synchronisation);

a storage area is reserved in the cache 27 of the device 13 for the LUN of the client application;

said storage area makes reference to the configuration data (set of addresses, volume size, block size, and so on) describing the characteristics of said LUN volume and is stored in an internal database 27b of the cache system module 27;

it is enabled inside module 22 a filtering process of the SCSI commands issued by the client mirroring software so that some of these commands are forwarded, through the module chain 23-26 towards the Recovery Data Centre, while some other commands are intercepted and forwarded towards the cache system module 27;

the cache control software 27a is informed that a new client has been enabled and that a particular storage area and a LUN descriptor inside the cache system module 27 have been assigned to said client.

In particular, the writing operation from the PDC to the RDC by using SCSI protocol may be articulated in four steps:

a) the initiator device sends a writing request to the target device for writing a number N of data blocks;

b) the target device sends an acknowledgement signal to the initiator device;

c) after receiving the acknowledgement signal, the initiator sends N data blocks;

d) the target device acknowledges the successful writing of the N data blocks.

Tasks b) and d) must be performed by the modified SCSI target device 22. More in particular:

the modified SCSI target module 22 receives from the mirroring application (and the SCSI initiator united to it) in the Primary Data Center a writing request for writing a certain number N of data blocks;

the module 22 intercepts the writing command and, being a writing operation, recognises that said command is one of those concerning the cache system 27: therefore it is verified whether the cache system is able to store those data blocks; in positive case, the module 22 replies by sending a data request message according to the SCSI standard to the mirroring application;

the mirroring application sends the N data blocks;

the module 22 retrieves the destination address of said data blocks and divert them to the storage area of the cache 27 dedicated to the client which is sending the data: more in particular, the module 22 shall extract from the SCSI block and store in the cache according to what has been previously indicated the data content, the address inside the volume and the meaningful information of the header (DPO (Disable Page Output), FUA (Force Unit Access), and so on) of the write command of the SCSI protocol;

the cache software 27a takes charge of carrying out the destaging process and of forwarding the writing request to the RDC as already described.

In the same way, also the reading commands shall be intercepted by the cache 27, because in negative case it would be possible to read from the RDC a data item not updated because still present in cache 27.

Therefore, when a reading request reaches the module 22, the module 22 through the cache management software 27a carries out a control to check whether the block is present or not in cache according to the procedures described in FIG. 5C.

As it has been previously explained, the cache size needs not to be large; on the contrary, one advantage of the present invention is that it can be kept significantly small. The following description will explain how to estimate the necessary cache size to allocate to a client/application when using typical network parameters.

This estimate is based on the assumption that the device 13 operates in an equilibrium state between the arrival of new data blocks from PDC, one or more, and their forwarding to the RDC (destaging). This equilibrium state is guaranteed by the writing and destaging processes previously described. Therefore this estimate is a useful tool for planning and dimensioning the device 13 but it is not a necessary condition for its stable operation.

If a data block in transit between the cache 27 and the Recovery Data Centre RDC is not lost or corrupted, it remains inside the cache 27 for a time interval determined by the serialisation time added to the round trip time between the cache and the RDC, that is to say the time interval necessary for receiving an acknowledgement signal from RDC. After having received said acknowledgement signal, the data block can be erased from the cache 27 since it has been successfully stored in the RDC.

The estimate of the average number of data blocks present in cache for a single client/application (as a consequence of PDC write operations) can be determined, for example, as $$N_{CACHED} = [(T_{RT2} + T_S)/(1/R)] + [T_{MAX}/(1/R)] + [T_{RT1}/(1/R)]$$

wherein the square brackets indicate that the result is to be rounded to the upper integer number (the meaning of the different parameters in this formula is defined below). This estimate of the average number of blocks $N_{CACHED}$, incremented by a suitable margin to take into account fluctuations of the parameters values, can be used for dimensioning the cache memory of the device 13, having defined the size of the single data block. The above formula for $N_{CACHED}$ comprises 3 adds:

The first add, $[(T_{RT2} + T_S)/(1/R)]$, represents the number of blocks arriving to the cache and can be determined as a function of the serialization time ($T_S$), the round trip time ($T_{RT2}$) of the part of the network between the device 13 and the RDC, and 1/R that represents the mean inter-arrival time between two consecutive data blocks;

The second add, $[T_{MAX}/(1/R)]$, represents the number of blocks "under destaging" that for some reasons do not have reached the RDC within a specified time limit (time-out). It can be determined as a function of $T_{MAX}$, that represents the time interval elapsed between the reception by the device 13 of the first data block that will result to be lost, and the time-out of the last block for which a time-out event is managed by the device 13. $T_{MAX}$ can be determined, for example, as $$T_{MAX} = T_{OUT} + T_S + (N_{MAX} - 1) \cdot \max(1/R, T_S)$$

wherein $T_{OUT}$ is a settable parameter representing the time-out interval for a single block sent from the device 13 to RDC, and $N_{MAX}$ is a settable parameter representing the maximum number of blocks for which a time out event is managed by the device 13;

The third add, $[T_{RT1}/(1/R)]$, represents the number of blocks sent by the client to the cache before the cache has informed the client that the disk mirroring service is temporarily unavailable, being $T_{RT1}$ is the round trip time of the part of the network between the PDC and the device 13

Applicant experiments have proved that the application of a formula of the type reported in the foregoing gives the results that the size of the cache memory is in the range from few hundreds of kB to few MB for each client/application able to produce some tens of transaction per second.

Therefore, by applying the architecture of present invention, it is not necessary to replicate in the intermediate site the whole data set present in the PDC, one or more, and, contrary to a multi-hop architecture, it is possible to save disk storage and corresponding maintenance and personnel costs.

A possible improvement involving the modules 27,27a, 27b consists in individuating which zones of the disk storage, located at the intermediate site and associated to the client application, have particularly frequent accesses (known as "hot zones") for handling them differently with regard to the zones less accessed; for instance, the "hot zones" may be transferred to the RDC only when they are in a stable state and not continuously, thereby allowing a considerable bandwidth saving in the network section between the device 13 and the RDC.

Figure 7:
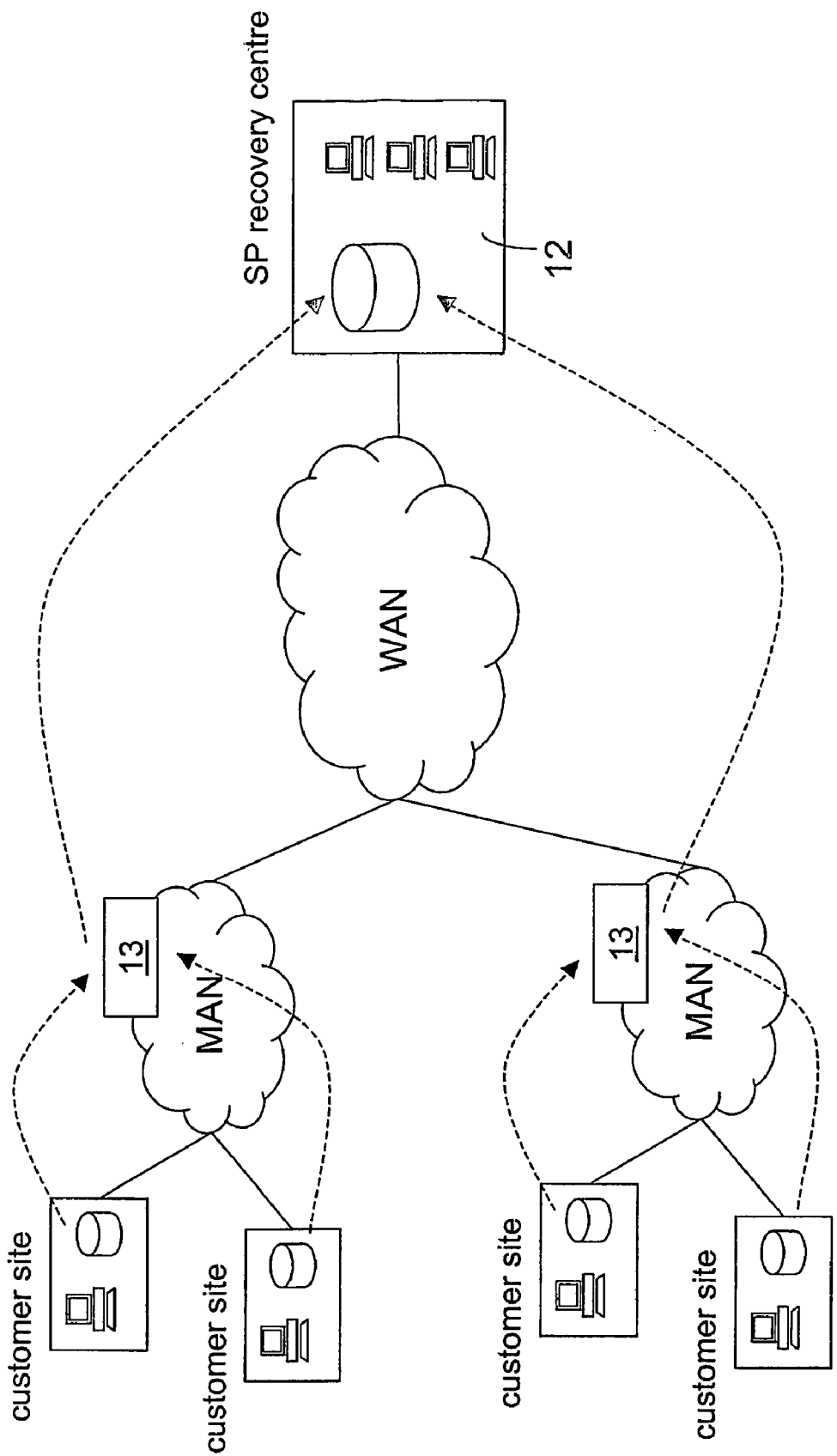
FIG. 7 schematically illustrates a scenario in which a Storage Service Provider may implement a mirroring service according to the present invention.

With reference to FIG. 7, it will now be explained how a Service Provider (SP) may exploit the present invention. More in particular, it should be remarked that the present invention allows a SP to increase the number of areas where it can offer a synchronous mirroring service and simultaneously to limit the number of RDCs.

According to the above scenario the SP provides a site containing a device 13 in every metropolitan area and one or more RDCs 12 in a geographical area far away from said metropolitan areas. The device 13, as can be apparent to a skilled person, need not to be a stand-alone device but can be integrated in network apparatuses.

Figure 8:
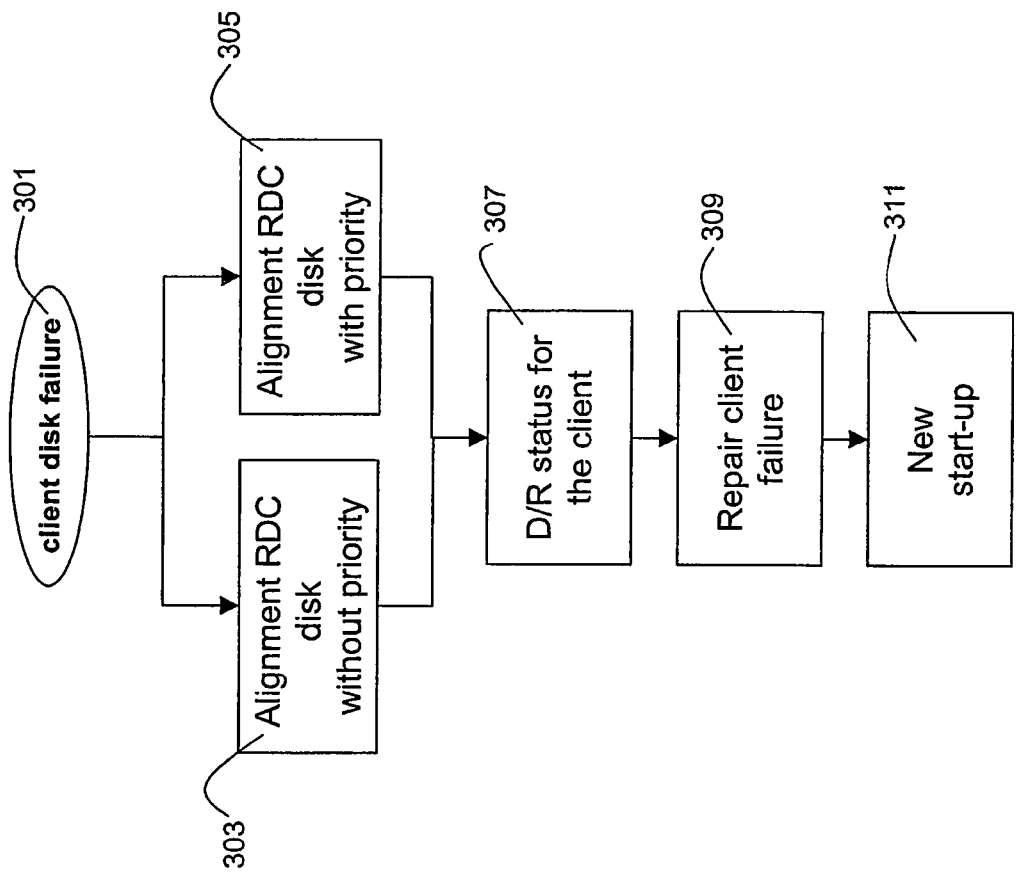
FIG. 8 is a flow chart showing possible failure states of a client system.

FIG. 8 illustrates the use of the invention in a disaster/recovery scenario, and in particular the operations to be performed when a situation in which the client disk undergoes a failure (step 301) and the real recovery process is triggered. The recovery process can occur according to different ways, but all have to be preceded by the realignment of the RDC disk (steps 303 and 305) with the data still stored in the cache (destaging). The updating can occur through a "marking" process (step 305) of the client data needing a recovery process so that they have priority with respect to the data of other clients, or by letting the intermediate site ignore that a failure situation exists so that it may go on with the normal transferring activity to the RDC.

The main alternatives for restoring the client's data and applications are:

by exploiting the data available after the destaging to the RDC, it is possible to restart the client application at the RDC (classic disaster/recovery approach) (307);

restoring the client data on a new disk at the PDC from the replica in the RDC, by possibly providing for the activation of an alternative connection at high bit-rate;

temporarily enabling the access to the RDC data as a primary disk.

After the disaster/recovery status, the client PDC is repaired (309) and, the synchronous mirroring replication can be institute again beginning with a new set-up phase (311) for the client affected from the failure.

The invention further allows to institute an original network service for supporting a synchronous data replication service. The profile of a possible customer of the network service is essentially that of a subject who intends to synchronously replicate information from a first site to a second site located at a considerable distance (hundreds of kilometres) from the first one, said subject not having the availability of sites located at intermediate distance between the first and the second site or not willing to manage intermediate storage apparatuses.

A customer having such needs may be either a company ("retail customer") wishing to protect its own data by using a synchronous mirroring technique or a Service Provider SP ("wholesale customer") intending to offer disaster recovery and/or business continuity services to its final customers.

Said particular network service could be defined as a "synchronous mirroring acceleration at long distance". In fact, through said service and thanks to the acknowledgement signal returned by the device 13, from the point of view of the client application the synchronous replication between the local copy of the data item and its remote copy occurs as if the distance between the two sites would be shorter that the real distance.

This allows to carry out a synchronous mirroring, that implies blocking the data production until the acknowledgement signal of successful writing of the previous data item is received, without that the real distance between the two sites can impact on the time during which the application is blocked waiting for an acknowledgement signal and therefore on its performance.

Said service is completely transparent to the client, which means that the client shall not modify its system and its way of operating with regard to a classic configuration of synchronous mirroring.

Figure 9:
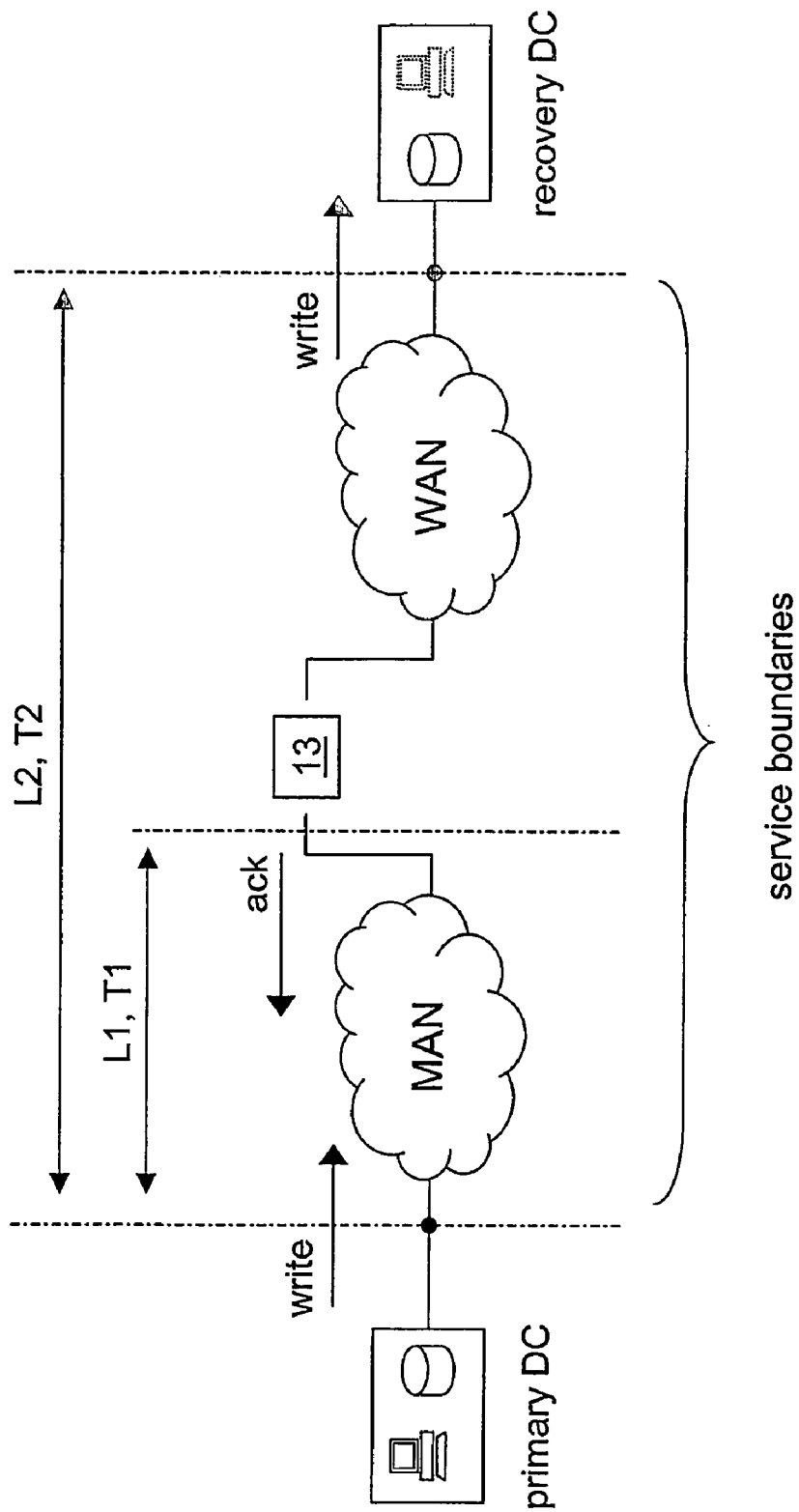
FIG. 9 and FIG. 10 illustrate a network wherein characteristic parameters of a mirroring service according to the present invention are pointed out.

The service architecture is illustrated in FIG. 9 wherein in the PDC and in the RDC are stored two copies of the data. These two sites are administered by the final customer and/or by the SP, thus not by the carrier offering the acceleration service. FIG. 9 points out the boundaries of the acceleration service and the elements under the carrier's administration, that is to say the network infrastructures, e.g. the Metropolitan Area Network or MAN, and the Wide Area Network or WAN, and the device 13 located in the intermediate site (for instance a carrier's metropolitan exchange).

Figure 10:
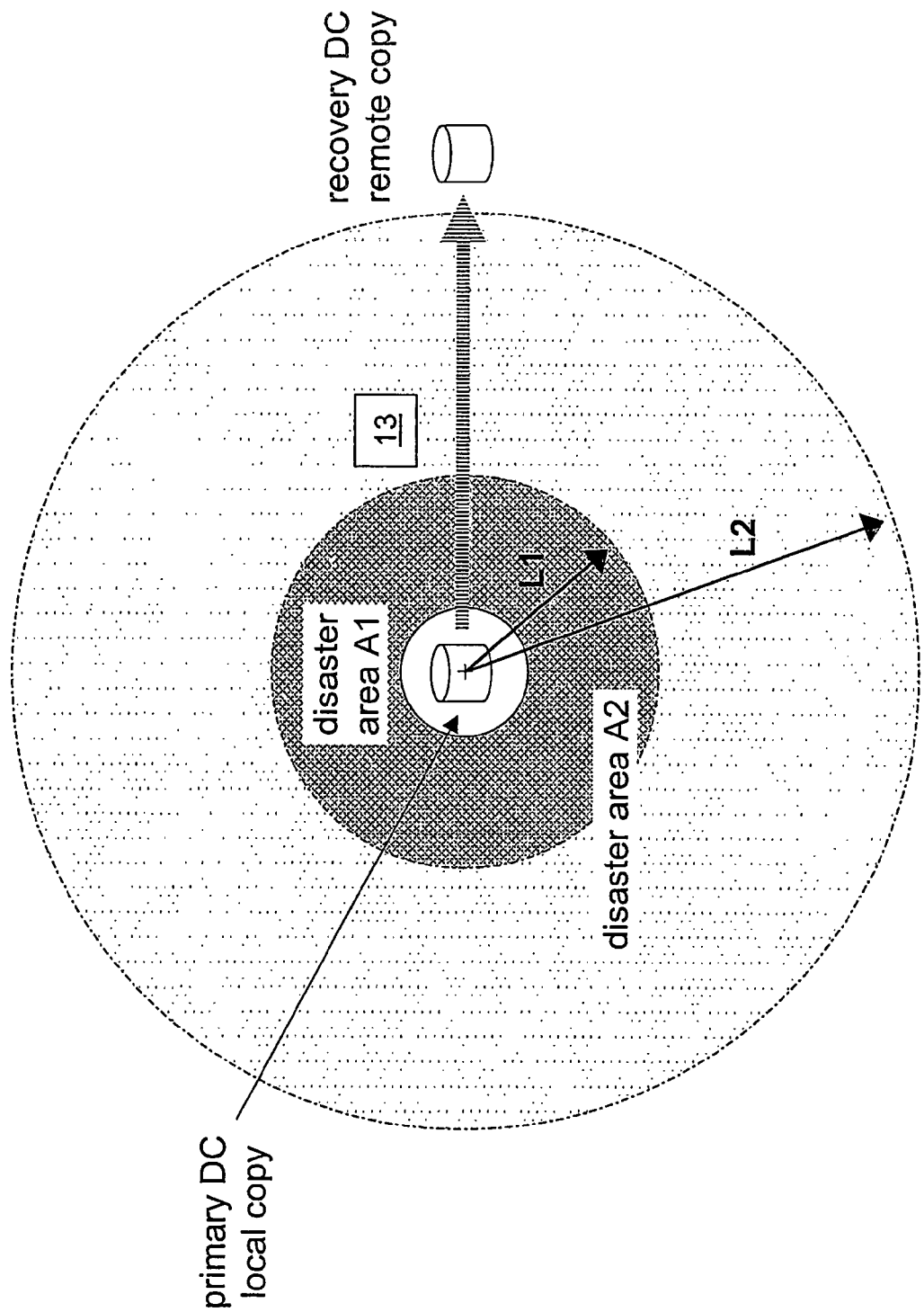

FIGS. 9 and 10 further point out the service main features, in particular:

L1 and L2 individuate two areas protected from disasters. For events having an extension lower than L1 (disaster area A1) that is events not interesting the device 13, the service guarantees a RPO equal to one transaction; for disasters having an extension lower than L2 (disaster area A2) and greater than L1, the service provides that the data possibly lost are at the most those in transit by the device 13 when the disaster happened, depending on the cache destaging policy;

T1 and T2 respectively define the maximum time interval during which the writing acknowledgement occurs and the maximum time interval within which the copy of the data item is completed in the RDC as well.

On the basis of the four parameters L1, L2, T1, T2, it is defined the Service Level Agreement SLA of the service with the customer. In particular, it should be remarked that in case the disaster affects the disaster area A2, the number of lost transactions is equal to those produced by the client application during the maximum time interval T2.

Summing up, the service offers:

acknowledgement of the remote copy command within a fixed time limit T1 lower than the characteristic time of a traditional synchronous mirroring technique, e.g. T1<0.5 ms:

distance L2 of the remote copy even greater than the maximum distance allowed in case of local or proximal synchronous mirroring technique, e.g. L2>>50 km;

copy of the data item available in the remote disk within a maximum interval time T2 which, depending on allocated bandwidth on the Wide Area Network WAN and the destaging policy, can be rendered very close to the overall propagation time for covering the distance L2:

guarantee of losing at the most one transaction for disasters having a range lower than L1 and of losing at the most the transactions produced during the time interval T2 for failures in the range L1<R<L2.

Figure 11:
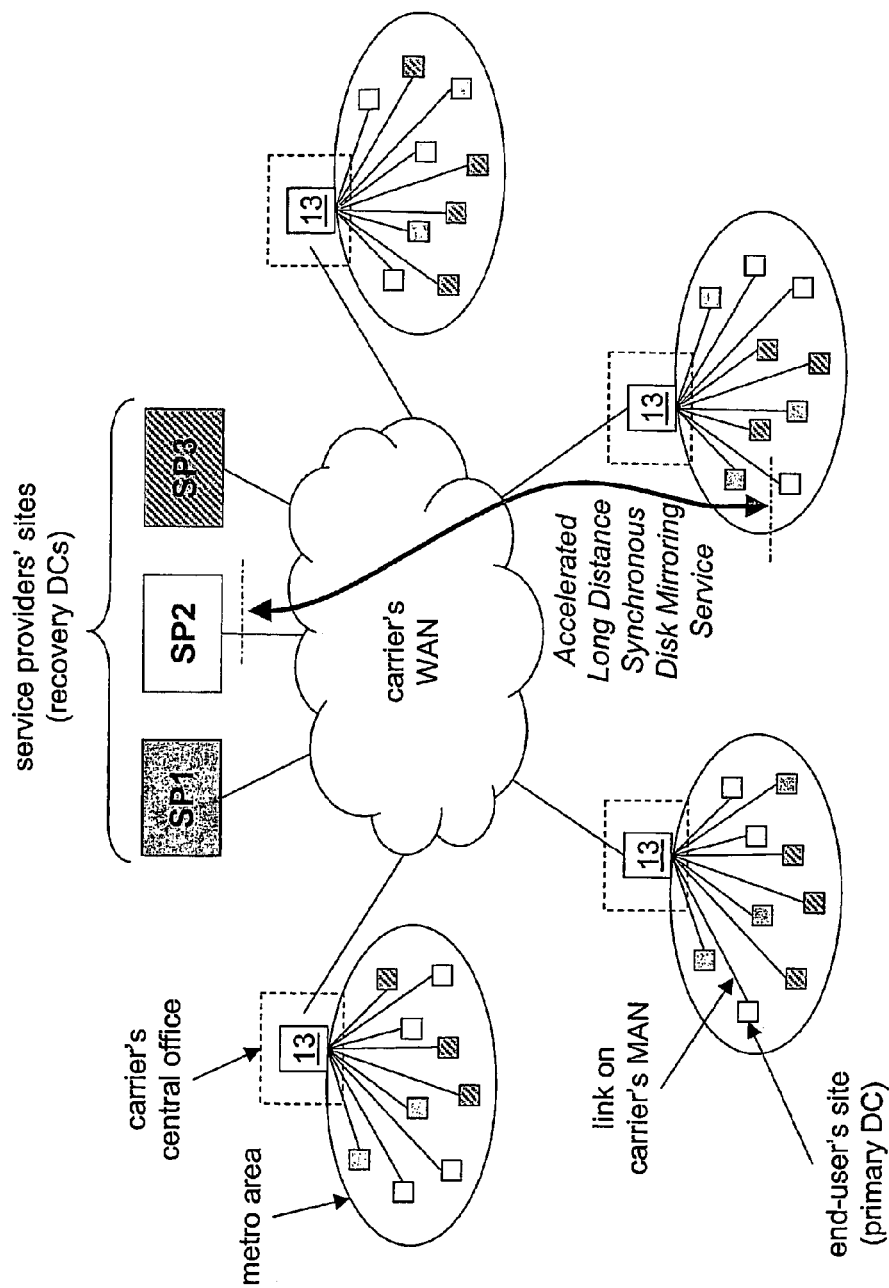
FIG. 11 shows a network in which a mirroring service is offered in wholesale modality.

FIG. 11 illustrates the acceleration service offered in wholesale modality by a carrier. The main features are:

dislocation of the devices 13 in Metropolitan Area Networks MAN in exchanges owned by the carrier;

the service is offered by the carrier to different Service Providers SP that in turn offer a service of disaster recovery to their final customers; in FIG. 10 the SPs and their respective customers are identified by the same hatching inside the boxes;

the boundaries of the service offered by the carrier (dash-point line) extend from the provider's site limit to the final customer's site.

The present invention will solve the problem of the distance limit in synchronous mirroring data replication between PDC and RDC, by inserting an intermediate site of storage at such a distance from PDC so as to guarantee the synchronicity for the majority of applications and, on the other side, by placing the RDC at a huge distance from PDC, so as to minimise the risk of double failure (damaging both PDC and RDC), and so increasing availability of stored information.

Although the present invention has been illustrated with reference to actually preferred embodiments, it is generally subjected to other applications and modifications which fall within the scope of the invention, as it will be evident to the skilled of the art.

The disaster recovery scenario is only an example of the possible uses and finalities of the invention. It should be remarked that the invention per se performs a copy, in synchronous way with respect to the client application, of a determined data volume present in the first site to a second site which could be geographically very far away from the first one. Other patterns of service, different from that providing the recovery and/or the use of remotely stored data, could make use of this functionality.

The invention claimed is:

1. A system for updating a data set through a communication network, said data set being stored in a recovery storage unit located in a recovery data centre and having to be updated with incoming data blocks generated by at least one processing system associated with a primary data centre, comprising:

a device interposed between said primary data centre and said recovery data centre through said communication network and associated with a temporary storage area for temporarily writing in corresponding storage locations the incoming data blocks generated by said processing system and for forwarding said data blocks to said recovery data centre wherein said device comprises modules capable of:

sending a first synchronous acknowledgement signal to said primary data centre acknowledging the successful writing in said temporary storage area of said data blocks as soon as said data blocks are written in said temporary storage area, receiving and managing a second acknowledgement signal sent by said recovery data centre acknowledging the successful updating of said data set following the forwarding of said data blocks, making available for new incoming data blocks the locations of said temporary storage area following the receipt of said second acknowledgement signal, and writing said data blocks in said temporary storage area into an address requested by said primary data centre as follows:

when the data blocks at the requested address are already written in the temporary storage area have been forwarded and the acknowledgement from said recovery data centre has not been received, writing said data blocks in a new location in said temporary storage area.

2. The system according to claim 1, wherein said processing system is associated with a primary storage unit where a copy of said data set is stored.

3. The system according to claim 2, wherein said temporary storage area has a storage capability lower than the storage capability both of said primary storage unit and of said recovery storage unit.

4. The system according to claim 1, wherein the distance between said device and said primary data centre is lower than the distance between said device and said recovery data centre.

5. The system according to claim 1, wherein said communication network comprises at least one protocol selected from the group of an iSCSI type protocol and a fibre channel type protocol.

6. The system as claimed in claim 4, wherein said device comprises:

interface modules for interfacing said device to said primary data centre and to said recovery data centre respectively;

a filter module for intercepting I/O commands sent by said primary data centre and for selectively sending said commands either to said temporary storage area for temporarily storing said data blocks or to said recovery data centre; and a control module for receiving said data blocks with their relative address parameters from said primary data centre, encapsulating said data blocks inside commands reserved for the management of said recovery storage unit and forwarding them to said recovery data centre.

7. The system according to claim 6, wherein said device comprises:
- a host bus adapter toward said primary data centre;
- a modified SCSI target device, arranged downstream of said host bus adapter;
- a cache system associated with said modified SCSI target device;
- a logical volume manager or LVM device arranged downstream of said modified SCSI target device;
- an SCSI subsystem arranged downstream of said logical volume manager device; and
- a further host bus adapter toward said recovery storage unit.

8. The system according to claim 1, wherein said device comprises:
- a network interface card;
- an iSCSI target device arranged downstream of said network interface card;
- a modified SCSI target device arranged downstream of said iSCSI target device;
- a cache system associated with said modified iSCSI target device;
- a logical volume manager or LVM device arranged downstream of said modified SCSI target device;
- a native SCSI subsystem arranged downstream of said logical volume manager device;
- an iSCSI initiator device arranged downstream of said SCSI subsystem; and
- a further network interface card toward said recovery data centre.

9. The system according to claim 1, wherein said device for temporarily storing said data blocks comprises a network device associated with said communication network.

10. The system as claimed in claim 1, wherein storage units are disk storage units.

11. The system as claimed in claim 1, wherein said temporary storage area comprises a plurality of storage areas respectively dedicated to a plurality of processing systems and/or to a plurality of primary data centres.

12. A communication network associated with a system for updating a data set as claimed in claim 1.

13. A method for updating a data set through a communication network, said data set being stored in a recovery storage unit located in a recovery data centre and having to be updated with incoming data blocks generated by at least one processing system associated with a primary data centre, comprising the steps of:
- temporarily writing through said communication network the incoming data blocks generated by said processing system in corresponding storage locations of a temporary storage area associated with a device interposed between said primary data centre and said recovery data centre;
- providing by said device and through said communication network a first synchronous acknowledgement signal to said primary data centre acknowledging the successful writing in said temporary storage area of said data blocks as soon as said data blocks are written in said storage area;
- forwarding by said device and through said communication network said data blocks to said recovery data centre;
- receiving and managing by said device and through said communication network a second acknowledgement signal acknowledging the successful updating of said data set into said recovery data centre; and
- making available for new incoming data blocks the locations of said temporary storage area following the receipt of said second acknowledgement signal;
- wherein the step of temporarily writing the incoming data blocks in said device comprises:
  - writing said data blocks in a new location in said temporary storage area if the data blocks at the requested address are already written in the temporary storage area have been forwarded and the acknowledgement from said recovery data centre has not been received.

14. The method according to claim 13, comprising the step of:
- storing said data set into a primary storage unit associated with said processing system.

15. The method according to claim 13 wherein the step of temporarily writing the incoming data blocks in said storage area comprises the further step of:
- writing by replacing the data blocks which have not been forwarded yet, if the data blocks at the requested address are stored twice in said storage area.

16. The method according to claim 13, wherein said step of forwarding said data blocks from said device to said recovery data centre comprises the steps of:
- polling said storage area associated with said device for checking whether there are any data blocks to be forwarded to said recovery data centre;
- sending to said recovery data centre the data blocks to be forwarded and simultaneously starting a timer having a predetermined timeout delay; and
- wherein the step of receiving and managing said second acknowledgement signal comprises the steps of:
  - checking whether said timeout delay has elapsed;
  - incrementing a counter representative of lost data blocks if said timeout has elapsed; and
  - sending an alert to the primary data centre for locking any further transmission of data blocks to said device if said counter of lost data blocks has reached a predetermined value.

17. The method according to claim 16, wherein said timeout delay is set to a value greater than the round trip time for a data block to be sent from said device and received by said recovery storage unit.

18. The method according to claim 16, wherein the step of receiving and managing said second acknowledgement signal comprises the step of managing a negative acknowledgement signal indicating that said data blocks have arrived to the recovery data centre, but are corrupted.

19. The method according to claim 13, for recovering data blocks toward the primary data center, further comprising the steps of:
- requesting recovered data blocks by said device to said recovery data centre, if the data blocks at the requested address are not stored in said temporary storage area;
- reading recovered data blocks from the temporary storage area if the data blocks at the requested address are stored in said storage area and they have not undergone the forwarding step to the recovery data centre;
- reading recovered data blocks from the temporary storage area if the data blocks at the requested address are stored in said temporary storage area and they have been forwarded to the recovery data centre; and
- recovering said recovered data blocks by said device toward said primary data centre through at least one of said previous steps on request of said primary data centre.

20. A computer readable medium encoded with a computer program product loadable into a memory of at least one electronic computer and comprising portions of software code for implementing the method as claimed in claim 13.

21. A device for updating a data set through a communication network, said device being associated with a storage area for temporarily writing in corresponding storage locations incoming data blocks generated by a processing system associated with a primary data centre and for forwarding said data blocks to a recovery storage unit located in a recovery data centre, comprising modules capable of:
sending through said communication network a first synchronous acknowledgement signal to said primary data centre acknowledging the successful writing in said temporary storage area of said data blocks as soon as said data blocks are written in said temporary storage area,
receiving through said communication network and managing a second acknowledgement signal sent by said recovery data centre acknowledging the successful updating of said data set following the forwarding of said data blocks,
making available for new incoming data blocks the locations of said temporary storage area following the receipt of said second acknowledgement signal, and
writing said data blocks in said temporary storage area into an address requested by said primary data centre as follows:
when the data blocks at the requested address are already written in the temporary storage area have been forwarded and the acknowledgement from said recovery data centre has not been received, writing said data blocks in a new location in said temporary storage area.

22. The device according to claim 21, wherein said processing system is associated with a primary storage unit where a copy of said data set is stored.

23. The device according to claim 21, wherein the distance between said device and said primary data centre is lower than the distance between said device and said recovery data centre.

24. The device according to claim 21, comprising modules capable of interfacing at least one protocol selected from the group of an SCSI type protocol, an iSCSI type protocol and a fibre channel type protocol.

25. A device according 21, comprising:
interface modules for interfacing said device to said primary data centre and to said recovery data centre respectively;
a filter module for intercepting an I/O command to which data are associated and for deciding whether to send said command either to a storage area for temporarily storing said blocks or to said recovery storage unit; and
a control module for receiving said data blocks with their relative address parameters, encapsulating them inside commands reserved for the management of said recovery storage unit and sending them to said recovery data centre.

26. The device according to claim 21, comprising:
a network interface card toward said primary data centre;
an iSCSI target device, arranged downstream of said network interface card or host bus adapter;
a modified SCSI target device arranged downstream of said iSCSI target device;
a cache system associated with said modified SCSI target device;

a logical volume manager or LVM device arranged downstream of said modified SCSI target device;
a native SCSI subsystem arranged downstream of said logical volume manager device;
an iSCSI initiator device arranged downstream of said SCSI subsystem;
a further network interface card or host bus adapter toward said recovery data centre.

27. The device according to claim 26, wherein said LVM device is replaced by a software virtualisation device.

28. The device according to claim 21, comprising:
a host bus adapter toward said primary data centre;
a modified SCSI target device arranged downstream of said host bus adapter;
a cache system connected to said modified SCSI target device;
a logical volume manager or LVM device, arranged downstream of said modified SCSI target device;
an SCSI subsystem arranged downstream of said logical volume manager device; and
a further host bus adapter toward said recovery data centre.

29. The device according to claim 28, wherein said LVM device is replaced by a software virtualisation device.

30. The device according to claim 21, comprising a network device associated with said communication network.

31. A method of providing a synchronous mirroring service for updating a data set through a communication network, said data set being stored in a recovery storage unit located in a recovery data centre and having to be updated with data blocks generated by at least one client system associated with a primary data centre, comprising the steps of:
temporarily writing through said communication network incoming data blocks generated by said at least one client system in corresponding storage locations of a temporary storage area associated with a device interposed between said primary data centre and said recovery data centre;
providing by said device and through said communication network a first synchronous acknowledgement signal to said primary data centre acknowledging the successful writing in said temporary storage area of said data blocks as soon as said data blocks are written in said storage area;
forwarding by said device and through said communication network said data blocks to said recovery data centre;
receiving and managing by said device and through said communication network a second acknowledgement signal acknowledging the successful updating of said data set into said recovery data centre; and
making available for new incoming data blocks the locations of said temporary storage area following the receipt of said second acknowledgement signal;
wherein the step of temporarily writing the incoming data blocks in said device comprises:
writing said data blocks in a new location in said temporary storage area if the data blocks at the requested address are already written in the temporary storage area have been forwarded and the acknowledgement from said recovery data centre has not been received.

32. The method of providing a synchronous minoring service according to claim 31, further comprising the steps of:
connecting a plurality of primary data centres to said device for temporarily writing respective data blocks generated by respective client systems associated with said plurality of primary data centres, said device being arranged in a metropolitan area type network;

connecting said metropolitan area type network to a wide area type network; and forwarding said respective data blocks from said device through said wide area type network to said recovery data centre.

33. The method of providing a synchronous mirroring service according to claim 32, comprising the further step of:

assessing priority in the process of transferring said respective data blocks from said device through said wide area type network to said recovery data centre with respect to respective data blocks of other client systems in case of a client system failure.

* * * * *

UNITED STATES PATENT AND TRADEMARK OFFICE
CERTIFICATE OF CORRECTION

PATENT NO. : 7,987,154 B2  
APPLICATION NO. : 11/659824  
DATED : July 26, 2011  
INVENTOR(S) : Di Giglio et al.

Page 1 of 1

It is certified that error appears in the above-identified patent and that said Letters Patent is hereby corrected as shown below:

* On the Title Page, Item (75), in the Inventors, line 2, "Eugenlo" should read
    --Eugenio--.

* On the Title Page, Item (74), in the "*Attorney, Agent, or Firm*", line 2,
    "Garret" should read --Garrett--.

* In claim 6, column 18, line 53, "claim 4," should read --claim 1,--.

* In claim 25, column 21, line 47, "according 21," should read
    --according to claim 21,--.

* In claim 32, column 22, line 61, "minoring" should read --mirroring--.

Signed and Sealed this  
Twelfth Day of March, 2013

Teresa Stanek Rea  
*Acting Director of the United States Patent and Trademark Office*